May 6, 1941.    M. H. DERDEYN    2,240,611
LAWN SPRINKLER
Filed Nov. 18, 1939    2 Sheets-Sheet 1
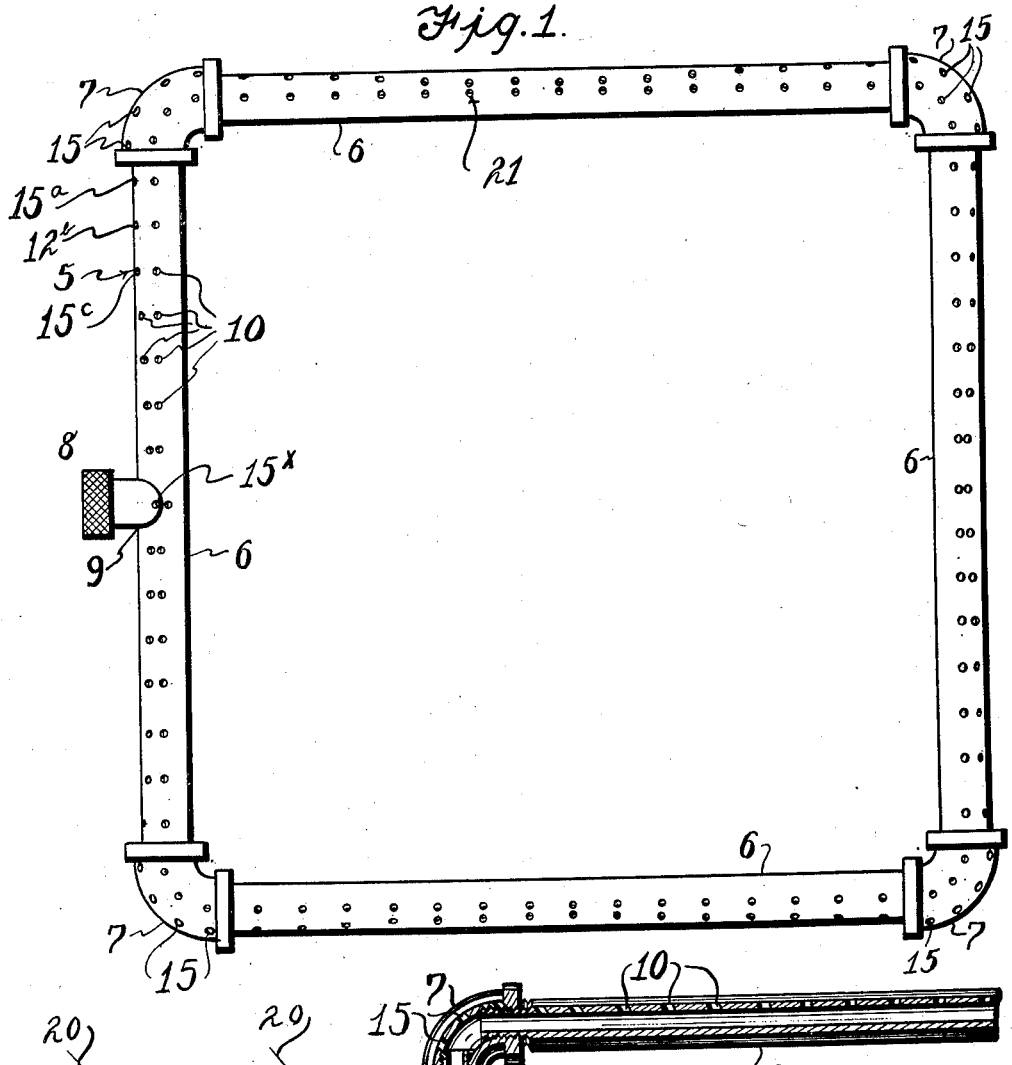
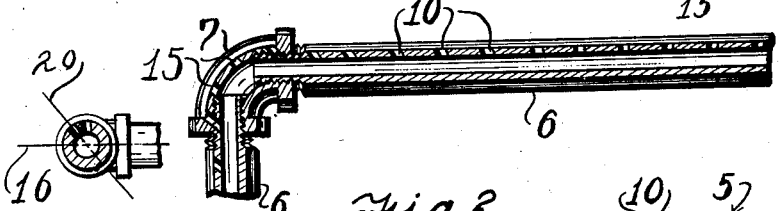
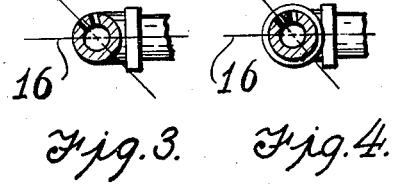
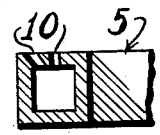
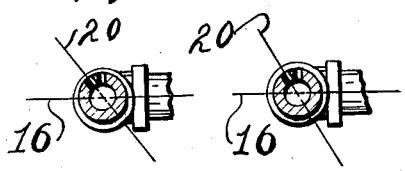
INVENTOR.
M. H. Derdeyn
BY
ATTORNEY.

May 6, 1941.　　　M. H. DERDEYN　　　2,240,611
LAWN SPRINKLER
Filed Nov. 18, 1939　　　2 Sheets-Sheet 2
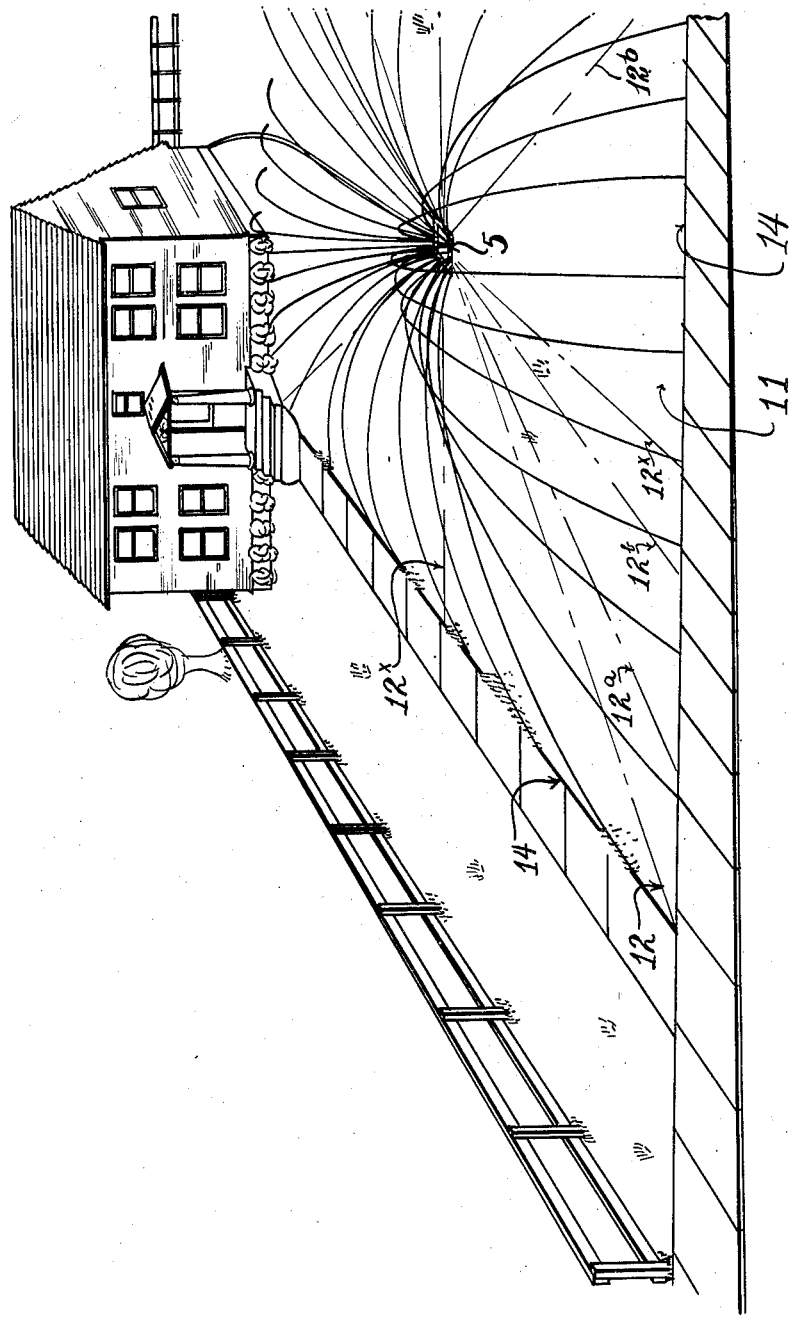
INVENTOR.
BY M. H. Derdeyn
ATTORNEY.

Patented May 6, 1941

2,240,611

UNITED STATES PATENT OFFICE 2,240,611

LAWN SPRINKLER

Marcell H. Derdeyn, Pawhuska, Okla.

Application November 13, 1939, Serial No. 305,137

2 Claims. (Cl. 299—19)

This invention relates to lawn sprinklers, and one chief object is to provide means for evenly sprinkling a rectangular plot of ground or lawn conformably with the rectilinear margins thereof and without wetting contiguous walks or the like.

Another object is to provide a sprinkler for the purpose stated above, the same including a flat frame having connected marginal water channels, the outer walls thereof being pierced with spray ducts or pores of gradually varied angular elevations, whereby the trajectories of the sprays are made to end outwardly along straight lines at each side of the sprinkler.

Another object is to provide a lawn sprinkler including a frame having pores or ducts therein for discharging jets or streams of water for wetting or sprinkling a plot of ground in rectilinear sections, without any overlapping of the sprinkling onto contiguous walks or paths.

With the stated objects in view, attention is directed to the accompanying drawings constituting part of this specification and wherein:

Figure 1 is a top plan view of the invention.

Figure 2 is a partial longitudinal sectional view of the device.

Figures 3 to 6 are transverse sectional views of the spray device.

Figure 7 is a transverse sectional view of a modified form of spray.

Figure 8 is a perspective view of the device in use.

In carrying out this invention in the preferred forms shown in the drawings, I provide a rectangular frame 5 made up of lengths 6 of piping connected at the corners in any suitable manner, as by the threaded elbows 7.

As shown in the drawings the piping may be either round or square in cross section, or of any other cross-sectional form. The frame itself is here shown as substantially square in plan, but obviously it may be made oblong if desired. Likewise the principle of the invention could be applied to a round or oval frame, although a square or oblong frame is more consistent with the principle involved. A hose connection 8 is welded or the like at 9 into one side of the frame. The frame is here shown without a stand but of course any desired form of stand or support may be added, as desired.

The gist of the invention lies in providing such a frame, having the lengths of piping at the four sides pierced radially and angularly with rows of pores or spray ducts, represented generally at 10, in such manner that the streams of water emerging therefrom will be evenly distributed over the plot in rectilinear sections and so that by properly positioning the sprinkler the plot may be nicely watered along its margins, and without wetting out over the contiguous walks.

Assuming the sprinkler or frame 5 to be squarely located at the center of a plot of lawn 11, it is obvious that the outer diagonal lines 12 subtending the corners of the sprinkler and the plot, are considerably longer than inner lines 12a—12b etc., and that these inner lines gradually decrease in length until the center lines 12x are reached, which extend perpendicularly between the sprinkler and the marginal lines 14 of the plot 11.

Therefore in piercing the ducts 10 radially into the piping, it is obvious that the corner ducts 15 must be given such angular elevation above the lines 16 defining the median plane of the frame, as to afford the greatest possible range or trajectory to the streams of water issuing therefrom, under any given water pressure. Similarly, it is apparent that the several ranges or trajectories of the inner streams issuing from the inner ducts 15a—15b—15c etc., must be gradually shortened, so that the outer limits or reaches of all of the streams at either side of the frame 5, at their points of contact with the ground, will approximately define a straight line.

In order to give the greatest range or trajectory to the corner ducts 15, these ducts must be given a certain angular elevation above the median line 16. Hence it follows that the inner streams from the ducts 15a—15b to 15x, may be gradually and successively shortened by locating the inner ducts on lines 20 extended from the corner ducts 15 inwardly in either a gradually diverging relation to the lines 16 or in a gradually converging relation thereto, as might be preferred.

As shown in the drawings the lines 20 from the corner ducts are extended inwardly to the centers of the pipes 6, in divergent relation to the median lines 16, but the same result, so far as the linear extension of the streams is concerned, could be had by converging the lines 20 on which the ducts are pierced centrally towards the median lines 16. The gradually increased elevations of the ducts 15—15a—15b inwardly to the center ducts 15x are clearly shown in Figures 3 to 6.

Additional rows of ducts as indicated at 21, may be pierced radially into the pipes 6 of the frame inwardly of the regular ducts 15—15a—15x for the purpose of spraying the intermediate spaces of the plot 11, within the range of the outer ducts 15—15a, etc.

In use, the sprinkler constructed as described, is placed upon the rectangular lawn or plot to be watered, in rectilinear relation thereto, that is to say with the sides of the sprinkler disposed in parallelism with the marginal lines of the plot. The water is then turned on so as to get the range of the streams. The sprinkler is then so located that the sprays of water will be nicely aligned with the marginal lines 14. After one rectangular section is thus sprayed, the sprinkler is moved for covering another section, and the process is repeated until the entire plot is sufficiently watered. Of course, if the plot is of proper size, the sprinkler may be located at the center and the plot covered in one operation as here shown. The range or trajectory of the streams may of course be varied by varying the water pressure. The pressure might need to be lowered on very small plots of lawn.

As before intimated the principle of rows of ducts having regularly varied or increased or decreased angular elevations, might be applied to round, circular or oval sprinkler frames, although the square or oblong form is thought best suited to the purpose. Also the device may be made of any suitable shape in cross section such as square as shown in Figure 7.

While I have here shown and described certain embodiments and structural features of the invention, the same may be changed or varied within the scope of the claims.

I claim:

1. A lawn sprinkler including a rectangular frame for positioning horizontally upon the ground, there being connected water channels encircling the lateral margins of the frame, the outer wall of each marginal channel being pierced with two rows of spray ducts starting evenly at the corners of the frame in a common plane and diverging from that plane centrally along the four sides of the frame, and means for forcing water through the channels and out through the spray ducts.

2. In a lawn sprinkler, four pipes connected in a rectangular form in a common plane, the outer walls of the pipes being pierced with rows of spray ducts starting at the corners of the structure in a common plane, and gradually diverging from that plane towards the centers of the pipes, and means for forcing water therethrough, whereby due to the gradient trajectories of the jets issuing from the ducts, a rectangular section of the ground is wet, upon which the sprinkler is horizontally located.

MARCELL H. DERDEYN.